United States Patent [19]

Pickering

[11] Patent Number: 4,881,511
[45] Date of Patent: Nov. 21, 1989

[54] CRANKCASE VENTILATOR

[76] Inventor: John J. Pickering, 102 Barrett Ave., North Providence, R.I. 02904

[21] Appl. No.: 290,269

[22] Filed: Dec. 23, 1988

Related U.S. Application Data

[62] Division of Ser. No. 62,072, Jun. 12, 1987, Pat. No. 4,821,513.

[51] Int. Cl.⁴ ............................................ F02M 25/06
[52] U.S. Cl. .................................... 123/572; 123/574
[58] Field of Search ...................... 123/572, 574, 41.86

[56] References Cited

U.S. PATENT DOCUMENTS

| | | | |
|---|---|---|---|
| 3,263,660 | 8/1966 | Hyde | 123/574 |
| 3,709,204 | 1/1973 | Nodomen | 123/574 |
| 4,011,846 | 3/1977 | Gagliardi | 123/574 |

Primary Examiner—Willis R. Wolfe
Assistant Examiner—M. Macy
Attorney, Agent, or Firm—Berman, Aisenberg & Platt

[57] ABSTRACT

A cleaning sytem for automobile exhaust gases has a perforated inlet allowing the gases to enter a sump area containing liquid for washing the gases. Nozzles spray cleaning liquid onto the washed gases passing through gas-permeable baffle plates, the cleaning liquid dropping into the sump area below. The cleaning liquid then passes to a tank for separating out pollutants and the gases pass to a second chamber for spray washing while passing through a further series of gas-permeable baffle plates. The cleaned gases are filtered in a separator box before passing into the atmosphere. Crankcase vapors may also be added into the stream of exhaust gases and cleaned in the system of the invention.

5 Claims, 3 Drawing Sheets

CRANKCASE VENTILATOR

RELATED APPLICATION

This application is a division of Ser. No. 062,072, filed June 12, 1987, now U.S. Pat. No. 4,821,513.

FIELD OF THE INVENTION

This application relates to an automobile exhaust gas cleaner and scrubber.

BACKGROUND OF THE INVENTION

Many exhaust gas cleaners and scrubbers for use in automobiles are known, but none of them are completely satisfactory. Peterson, U.S. Pat. No. 3,556,734, shows a device for cleaning exhaust gas which includs a plurality of filters through which the gas is directed. A venturi-type device directs liquid from a sump onto the filters. Ligutom, U.S. Pat. No. 3,742,682, shows a scrubbing device in which exhaust gas is directed through a single baffle section while being sprayed with a cleaning liquid. Walker, U.S. Pat. No. 4,184,858 shows a plurality of filters for cleaning exhause gases, a separate system being used for exhaust and crankcase vapors. The filters are sprayed with a cleaning liquid. The patent to Coyle, U.S. Pat. No. 4,300,924, shows a device for cleaning exhaust gases which includes a structure for directing the exhaust gas through a liquid sump, but does not include spraycleaning the gas to remove pollutants.

Morris, U.S. Pat. Nos. 2,578,576 and 2,578,577 describe a system of crankcase ventilation with associated vapor expulsion using electric fans for forcing ventilation of the crankcase of an internal combustion engine. Musbaum, U.S. Pat. No. 2,652,819, shows a ventilation system for an automobile crankcase in which condensed water is removed from the vapor, the vapor is filtered, and then admitted to the intake manifold of an automobile engine. Ballard, U.S. Pat. No. 3,509,967 shows a system for treating crankcase vapors in automotive engines employing two condenser-filter units. Each of these units includes a filter and relies upon expansion of the gases within the unit to cool the gases and cause the vapor to condense. The patent to Hollins, U.S. Pat. No. 3,828,744 shows a system for evacuating crankcase oil vapors, and includes a condenser for causing the oil vapors to condense and form droplets which then flow back into the engine.

SUMMARY OF THE INVENTION

The invention is a device for cleaning automobile exhause gases. Automobile exhaust gases are directed to a liquid sump having a plurality of gas-permeable baffle plates, arranged above the level of liquid in the sump, the plates being sprayed with fluid from a series of nozzles to clean the exhaust gas passing though the permeable baffle plates. The output gases from the first series of gas-permeable baffle plates are passed to a second series of gas-permeable baffle plates which are sprayed with liquid from nozzles as the gas passes therethrough. Impurities (caused by pollution) are condensed and removed, cleaned exhaust gas passing to the atmosphere. Crankcase vapors may also be pulled off, condensable pollutants removed therefrom, and the resulting gases added to the exhaust gases entering the gas cleaning system.

It is an object of the invention to provide an automobile exhaust gas cleaner in which pollutants are condensed from the exhaust gases and purified exhaust gas passed to the atomsphere.

It is another object of the invention to provide spray means for cleaning automobile exhaust gases.

BRIEF DESCRIPTION OF THE DRAWINGS

FIG. 1B is an elevational view, partly in cross-section, of apparatus of the invention showing the exhaust gas intake, first stage spray cleaning, and exit to the apparatus of FIG. 1a.

DETAILED DESCRIPTION OF THE INVENTION

The invention provides a method for cleaning automobile exhaust gas in which engine exhaust gases pass through two series of gas-permeable plates while being sprayed with a cleaning liquid. Crankcase vapors may be included in the exhaust gases being cleaned. The process of the invention advantageously provides clean, washed, exhaust gas, and takes place in a gravity fed system which is energy efficient.

Figure 1A:
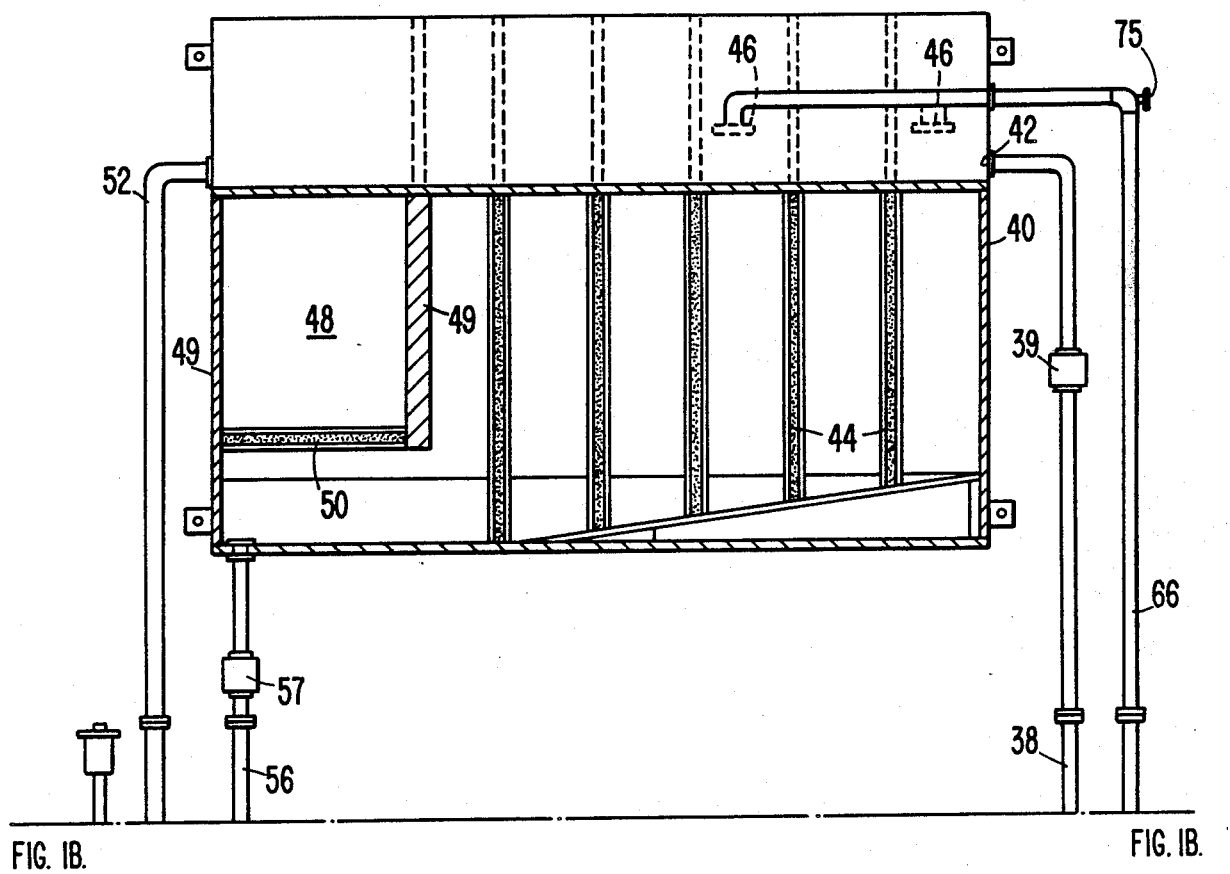
FIG. 1A is an elevational view, partly in cross-section, of a second-stage exhaust gas cleaning apparatus of the invention.
Figure 1B:
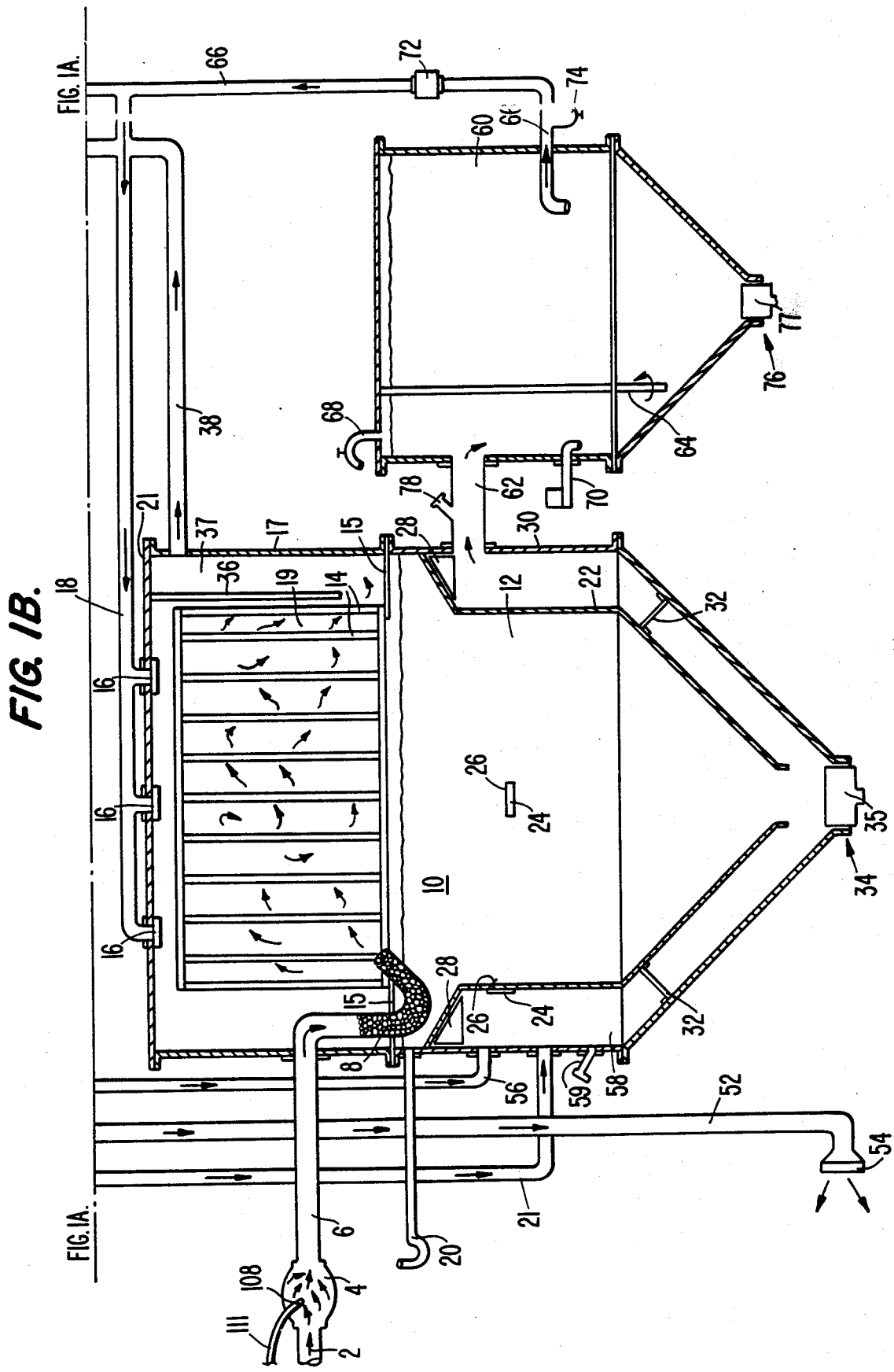

Exhaust gases pass through gas-permeable plates of FIG. 1B while being washed by liquid, such as water, from the spraying nozzles. The gases then pass upwards into the apparatus of FIG. 1A, passing through gas-permeable plates while simultaneously being washed by liquid dispensed by spray nozzles, and passing through a filtered separator box, before exiting and passing into the atmosphere. The spraying liquid which has washed pollutants from the exhaust gases during the spraying stages, falls by gravity into the lower sump area, shown in FIG. 1B. The solids are separated out and the liquid recirculated for reuse. The apparatus may also be used to wash crankcase vapors (from which some pollutants may already have been condensed) added to the exhaust gases entering the cleaning system.

Automobile exhaust gases enter the system at exhaust gas inlet 2, shown in FIG. 1B, which has an enlarged chamber 4 to allow mixing of the gases with crankcase vapors, if desired. The exhaust gases pass through pipe 6 which is perforated at elbow area 8 to allow exhaust gases to enter water 10 in sump area 12 where it is preliminarily washed. The gases then pass upwards through gas permeable baffle plates 14. When assembling the condensing units, gas permeable baffle plates 14 are inserted from the top of the condensing unit. Plates 14 are guided into place using guide pins, and attached to support arms 15 which are bolted to housing 17 of the condensing unit. The exhaust gases passing through gas permeable baffle plates 14 are simultaneously sprayed with liquid from spray nozzles 16, which are connected by pipe 18 to a source of water. Liquid exiting spray nozzles 16 falls into sump area 12 after passing through baffle plate chamber 19. Water 10 in sump area 12 is kept at an appropriate level, overflow water exiting through pipe 20. Filler pipe 21 is used to fill sump 12 with water and to refill it after cleaning. Sump insert 22 is supported in sump area 12 and has small openings 24 in its back wall and in two sidewalls. Each opening 24 has lip 26 on the top edge thereof to direct liquid, containing solid particles, downwardly while flowing over openings 24, thus directing the particles downwardly toward lower sump exit 34. Sump insert 22 rests on collar 28 secured to sump housing 30 and spacer legs 32 support sump insert 22 spaced from sump housing 30. Other appropriate means fo supporting sump insert 22 in sump housing 30 may be used. Sump exit 34 allows removal of pollutant particles and sludge, and is preferably secured by a threaded clean-out plug 35 or other removable closure. Sump area 12 may be flushed out through pipe 78, though overflow pipe 20, or through flush-out plug 59.

Gases which have passed through baffle plates 14 and which have been washed by spray from nozzles 16 pass downwardly below the lower edge of solid plate 36 and then pass upwardly through open chamber 37 to leave baffle-plate chamber 19 through exit pipe 38. Plate 36 is secured to roof 21 and to the sidewalls of housing 17, forcing gases beneath plate 36 to pass upwardly (against gravity) and out through pipe 38. A continuation of pipe 38 in FIG. 1B is shown in FIG. 1A.

Referring now to FIG. 1A cleaned gases passing through pipe 38 enter baffle-containing chamber 40 at gas entry 42, the gases permeating baffle plates 44 while being washed by water from spray nozzles 46. Pump 39 may be used to drive the gases through plates 44, if the pressure provided by the engine is not adequate. These cleaned exhaust gases pass through baffle plates 44, then pass upwardly to enter separator box 48 through filter 50, and exit box 48 through exhaust pipe 52 at the top of box 48. Gases exiting to the atmosphere through exhaust pipe 52 pass through replaceable thin charcoal filter insert 54, shown on FIG. 1B, before leaving the pipe. Separator box 48 has solid walls 49 an a floor of a filter material 50 which includes a sponge-like component to catch any fine moisture or particles. Gas permeable baffle plates 44 and filter 50 may be inserted from the top of chamber 40 and snapped into place.

Liquids from spray nozzles 46, which have washed the gases in baffle-containing chamber 40, collect in the bottom of chamber 40 and exit through pipe 56 (shown on FIG. 1B), draining into sump area 12 by gravity. Solids and sludge which collect in sump area 12 are removed through sump exit 34 when plug 35 is removed. If the parts shown in FIG. 1A are significantly displaced from those of FIG. 1B, a pump 57 may be used to ensure proper flow of liquid. Liquid from sump area 12 may flow over into reservoir 60 through channel 62 and may also be recirculated through openings 24 or through spray nozzles 16, and reused. Channel 62 is relatively large and allows slow return of liquid to reservoir 60. Heavier solids drop to sump exit 34 before liquid passes through channel 62, and lighter fluides carried over into reservoir 60 drop to clean-out opening 76 and are removed through plug 77.

Reservoir 60 contains solid baffle plate 64 around and under which the water flows before leaving reservoir 60 by means of pipe 66 leading to spray nozzles 16 and 46. Plate 64 may also have openings through the plate which may, for example, be semi-circular in shape, to facilitate even distribution of liquid. Reservoir 60 has a vent valve 68 for preventing the building of excess pressure. Water pump 72 pumps water up through pipe 66, through spray nozzles 16 of the condensing unit, shown in FIG. 1B, and through spray nozzles 46 of the expansion tank, shown in FIG. 1A. Pipe 66 may have a sediment collector 74 and a valve 75. Reservoir 60 has a clean-out opening 76, for removal of settled pollutants, by removal of plug 77, similarly to exit 34 in the sump area. The cleaning liquid is preferably water and this cleaning liquid is purified for reuse by settling out of suspended particles. The cleaned water is then recirculated for reuse.

The base of the expansion tank, shown in FIG. 1A is sloped downwardly toward return line 56, positioned at the low point of the tank, so that liquids in the tank cannot splash about as they would in a flat-bottomed tank.

If the water level in reservoir 60 falls to a very low level, low water alarm 70 is activated. Low water alram 70 may be connected to a signal on the dashboard of the vehicle. The water in the system preferably contains antifreeze or other non-freezing chemical additives for winter use. The expansion tank may be housed behind the back seat of a car or truck and the sump area and reservoir may be housed in the trunk of the vehicle. Other convenient locations will be apparent to one skilled in the art.

Figure 2:
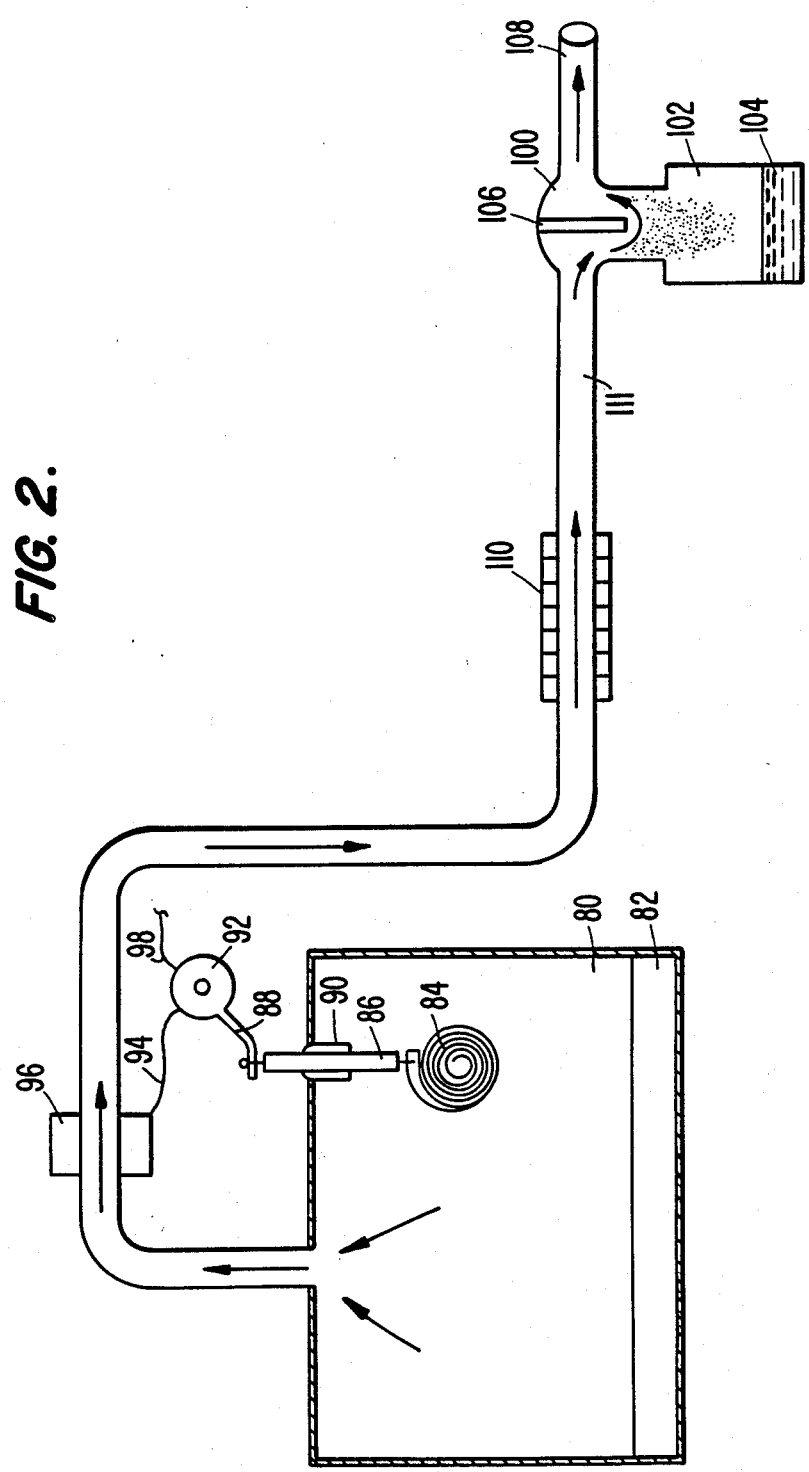
FIG. 2 is a cross-section schematic view of a motorized process of drawing vapor-laden air from an automobile crankcase for addition to the exhaust gases of FIG. 1b.

If desired, the crankcase vapor cleaning apparatus shown in FIG. 2 may be added to provide cleaning of crankcase vapors. Crankcase 80 contains oil 82 from which noxious vapors arise. These vapors normally either escape into the air or are directed into the cylinder to be burned. According to the invention, temperature-sensitive helix 84 is attached to push rod 86 which is maintained in alignment with rheostat arm 88 by guide sleeve 90. Voltage is supplied at conductor 98 from the electrical system and connected to rheostat 92. Conductor 94 supplies a variable voltage to crankcase motor 96 which pulls air and vapors through the crankcase and supplies it to the cleaning apparatus of FIGS. 1B and 1A. The rheostat varies the volume of air flow as a function of the engine's temperature to provide more flow for a hot engine because more vapors will be produced. Separator unit 100 is attached to detachable bowl 102, which is a screw-on bowl, and may be made for example, of clear plastic or of metal. Condensed vapors 104 fall to the bottom of the bowl as the crankcase oil vapor fumes are cooled and condensed by metal cooling fins 110 as the vapors pass along pipe 111. The vapors are forced to detour under solid separator plate 106 before leaving bowl 102 at vapor exit 108, which preferably leads into chamber 4, shown in FIG. 1B, where the crankcase vapors are mixed with the vehicle exhaust gases. Vapor exit 108 enters chamber 4 at a slight air ejector pitch, guiding fumes in the direction of flow into the condensing unit.

It is advantageous for motorists to use the exhaust air cleaner of this invention, since the air returned to the atmosphere is cleaner than that which normally exits a car's exhaust system even after being treated by a catalytic converter. According to this invention, exhaust is cleaned naturally by a spray of water which removes particulates and does not release noxious chemicals into the atmosphere.

The expansion tank of FIG. 1A is preferably larger than that of the main condensing unit, shown in FIG. 1B. The expansion tank of FIG. 1A is completely sealed and may be placed at any desired location. For example, it may be desirable to place the parts of FIG. 1B below the floor of a vehicle to permit easy access to the clean-out plugs while placing the parts of FIG. 1A inside the trunk. Any excess heat from the exhaust gases may be used, incidentally, to defrost the rear window of the vehicle in which the unit is placed.

The apparatus of th invention may also be used for condensing sulfur and other pollutants from industrial smoke stacks, using a scaled-up version of the process described. Sulfur compounds, ash, and other pollutants are removed by spray means as described herein.

While the invention has been described above with respect to certain embodiments thereof, it will be appreciated that various changes and modifications may be made without departing from the spirit and scope of the invention.

What is claimed is:

1. A crankcase ventilator comprising a conduit adapted to be attached to crankcase and a suction means for drawing air containing vapors from said crankcase through said conduit, a temperature sensitive element adapted to be placed in thermal contact with said crankcase, means for continuously varying the rate at which said suction means draws said air containing vapors from said crankcase according to temperature, and means connecting said varying means to said temperature sensitive element for causing said suction means to draw a greater volume of air from the crankcase when the crankcase is hot than when the crankcase is cold.

2. A crankcase ventilator comprising a conduit adapted to be attached to crankcase and a suction means for drawing air containing vapors from said crankcase through said conduit, a temperature sensitive element adapted to be placed in thermal contact with said crankcase, means for controlling the rate at which said suction means draws said air containing vapors from said crankcase, and means connecting said means for controlling to said temperature sensitive element,
    wherein said temperature sensitive element is a bimetallic helix, said means for controlling is a rheostat, and said means connecting is a rod.

3. A crankcase ventilator comprising a conduit adapted to be attached to a crankcase and a suction means for drawing air containing vapors from said crankcase through said conduit, a temperature sensitive element adapted to be placed in thermal contact with said crankcase, means for controlling the rate at which said suction means draws said air containing vapors from said crankcase, and means connecting said means for controlling to said temperature sensitive element, and means adjacent said conduit for condensing said vapors.

4. A crankcase ventilator according to claim 3 further comprising means in said conduit for separating said condensed vapors and means communicating with said separating means for collecting said condensate.

5. A crankcase ventilator according to claim 4 wherein said separating means comprises a plate extending from a wall of said conduit for deflecting said condensate to said collecting means.

* * * * *